US006227572B1

(12) United States Patent

Lyen

(10) Patent No.: US 6,227,572 B1
(45) Date of Patent: *May 8, 2001

(54) DURABLE TACTILE INDICIA FOR BANKNOTES/DOCUMENTS AND METHOD OF MAKING SAME

(76) Inventor: Eric A. Lyen, 67 Amberwood Crescent, Nepean, Ontario (CA), K2E 7C2

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,136

(22) Filed: Mar. 1, 1999

(51) Int. Cl.[7] .......... B42D 15/00; B31F 53/00; G09B 21/00

(52) U.S. Cl. .......... 283/58; 283/57; 434/113; 434/114; 434/117; 428/284; 428/131; 156/245; 156/228; 156/219; 101/3.1

(58) Field of Search .......... 283/57, 58; 434/113, 434/114, 117; 156/219, 312, 324, 245, 228; 428/284, 131; 264/511, 545; 101/3.1

(56) References Cited

U.S. PATENT DOCUMENTS

| | | | | |
|---|---|---|---|---|
| 1,635,032 | | 7/1927 | Clark et al. . | |
| 1,936,089 | | 11/1933 | Jacquerod . | |
| 3,313,052 | * | 4/1967 | Malster | 283/70 |
| 3,370,530 | * | 2/1968 | Henderson | 101/3 |
| 4,057,242 | | 11/1977 | Rau . | |
| 4,157,415 | * | 6/1979 | Lindenberg | 428/284 |
| 4,404,764 | * | 9/1983 | Wills et al. | 40/124.1 |
| 4,480,177 | | 10/1984 | Allen . | |
| 4,518,643 | * | 5/1985 | Francis | 428/131 |
| 4,646,634 | | 3/1987 | Espe . | |
| 4,776,797 | * | 10/1988 | Hernandez | 434/203 |
| 4,836,784 | * | 6/1989 | Burchart | 346/21 |
| 5,108,529 | * | 4/1992 | Shuert | 156/214 |
| 5,196,254 | * | 3/1993 | Akiyama | 428/178 |
| 5,283,028 | * | 2/1994 | Breezer et al. | 264/511 |
| 5,314,739 | | 5/1994 | Vidal . | |
| 5,399,217 | * | 3/1995 | Bloom | 156/277 |
| 5,449,240 | * | 9/1995 | Dorpfeld et al. | 400/427 |
| 5,466,155 | * | 11/1995 | Fay et al. | 434/115 |
| 5,612,117 | * | 3/1997 | Belanger et al. | 428/178 |
| 5,622,106 | | 4/1997 | Rayner . | |
| 5,635,129 | * | 6/1997 | Breezer et al. | 264/553 |
| 5,636,565 | * | 6/1997 | Lawrence et al. | 101/32 |
| 5,649,480 | | 7/1997 | Yim . | |
| 5,693,405 | * | 12/1997 | Harvie et al. | 428/156 |
| 5,753,350 | * | 5/1998 | Bright | 428/195 |
| 5,762,379 | * | 6/1998 | Salmon et al. | 283/91 |
| 5,779,482 | * | 7/1998 | Fukumoto | 434/113 |
| 5,820,377 | * | 10/1998 | Murphy et al. | 434/113 |
| 6,120,636 | * | 9/2000 | Nilsen et al. | 156/230 |
| 6,131,005 | * | 10/2000 | Ozawa | 399/107 |

FOREIGN PATENT DOCUMENTS

| | | |
|---|---|---|
| 0 687 771 | 12/1955 | (EP) . |
| 565708 | 11/1944 | (GB) . |

* cited by examiner

*Primary Examiner*—A. L. Wellington
*Assistant Examiner*—Alisa L. Thurston
(74) *Attorney, Agent, or Firm*—Lynn S. Cassan

(57) ABSTRACT

A sheet material, such as a bank note, having tactile indicia therein, the tactility of which is resistant to deterioration and useful for assisting persons with impaired vision to identify one or more predetermined characteristics of the sheet material such as a bank note. The sheet material has therein at least one embossment forming the indicia and comprises a first surface and a second surface, with one of the surfaces defining a cavity in the area of the embossment. A layer of reinforcing material is provided to at least the area of that surface which comprises the cavity. Once the reinforcing material is dried and/or cured the embossment (indicia) is strengthened by the layer of reinforcing material and thereby rendered more durable when the bank note is subjected to the wear of circulation. The reinforcing material may be selected from the group consisting of varnishes, inks, adhesives and caulking compounds.

17 Claims, 2 Drawing Sheets

DURABLE TACTILE INDICIA FOR BANKNOTES/DOCUMENTS AND METHOD OF MAKING SAME

FIELD OF THE INVENTION

The invention is in the field of document printing and production and, in particular, relates to the production of documents, such as banknotes, having embossments therein which provide durable tactile indicia for use, for example, by persons who are blind.

BACKGROUND

The denominational value or identity of banknotes and many other types of documents can be readily discerned by persons whose eyesight is not impaired but for persons who are blind it is necessary to use other means, such as a portable reader designed for the particular document in question, to determine such information. A printed braille section placed on such a document could provide a means for such identification and, advantageously, would be integral to the document and avoid the need for an auxiliary reading device. However, the broad circulation and public handling of documents such as banknotes subjects them to substantial wear and any braille printing applied to such documents in the normal manner of embossed printing would not be sufficiently durable because the embossments would soon be compressed and become non-tactile.

Consequently, there is a need in the industry for a means of providing to security documents, banknotes, etc. durable (i.e. relatively permanent) tactile identifying indicia which are able to withstand the substantial wear caused by public circulation and handling and can be readily used by persons with impaired eyesight to determine the denomination or identification of such document.

SUMMARY OF THE INVENTION

In accordance with the invention there is provided a sheet material (e.g. a sheet or laminate comprising paper) having tactile indicia the tactility of which is resistant to deterioration. The sheet material has therein at least one embossment forming the indicia. A first surface and a second surface are provided by the sheet material and one of the surfaces defines a cavity in the area of the embossment. A layer of reinforcing material is provided to at least the area of that one surface which comprises the cavity. The reinforcing material may be selected from the group consisting of varnishes, inks, adhesives and caulking compounds. Preferably, the thickness of the sheet material is between 75 micrometers and 150 micrometers, the outer width of the embossment is between 500 micrometers and 1200 micrometers and, for varnish, the thickness of the reinforcing material is between 20 micrometers and 40 micrometers.

The indicia may comprise a plurality of embossments arranged in a predetermined pattern such that the indicia enables a sight impaired person to identify one or more predetermined characteristics of the sheet material (e.g. the denomination) by means of feel. Preferably the indicia comprise one or more spaced symbols and each symbol comprises a plurality of rows and columns of embossments (four rows and two columns being preferred) wherein the outer width of each embossment is about 1000 micrometers, the embossments are spaced apart about 2000 micrometers in the symbols and the symbols are spaced apart about 14,500 micrometers.

Also provided in accordance with the invention is a method of making a sheet material having tactile indicia the tactility of which is resistant to deterioration. The steps of the method include embossing a sheet material comprising first and second surfaces with at least one embossment to form the indicia whereby one of the surfaces defines a cavity in the area of the embossment. A layer of a reinforcing material is applied to that one surface of the sheet material in at least the area comprising the cavity and the reinforcing material is dried and/or cured.

BRIEF DESCRIPTION OF THE DRAWINGS

The invention is described in detail below with reference to the following drawings which illustrate a preferred embodiment of the invention.

DETAILED DESCRIPTION OF A PREFERRED EMBODIMENT

Figure 1:
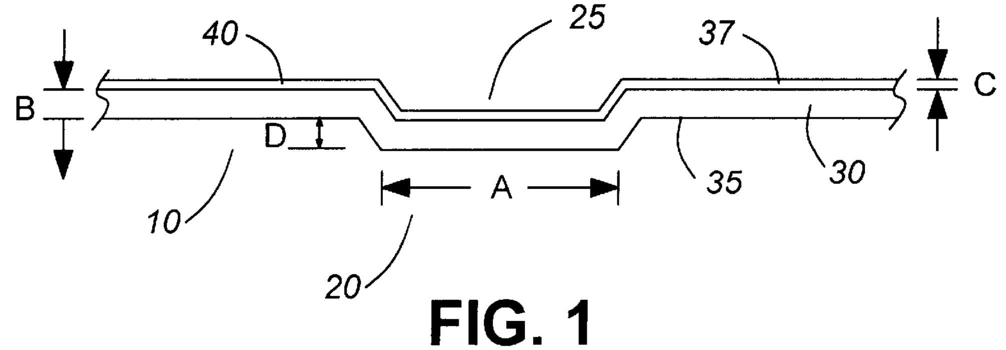
FIG. 1 is a cross-sectional view of a banknote substrate showing a single embossment therein which is reinforced in accordance with the present invention.

FIG. 1 of the drawings shows a cross-sectional view of a sheet material 30 in accordance with the claimed invention. In this example the sheet material 30 is a banknote 10 (see FIGS. 2 and 3) which has been embossed in a conventional manner by pressing the sheet between male and female dies or between a male die and compressible blanket. The sheet material may, for example, be comprised of paper or a lamination of a thermoplastic layer sandwiched by two paper layers and, alternatively, could be any of a variety of other substrates, such as plastic, which will be readily recognized by one skilled in the art. The sheet material 30 has first and second surfaces, one of which is the top surface 35 and the other of which is the bottom surface 37. In the illustrated embodiment the embossments are situated to provide raised areas on the top surface of the bank note but, if desired, an embodiment providing the embossments on the bottom surface of the bank note could instead be selected.

Figure 2:
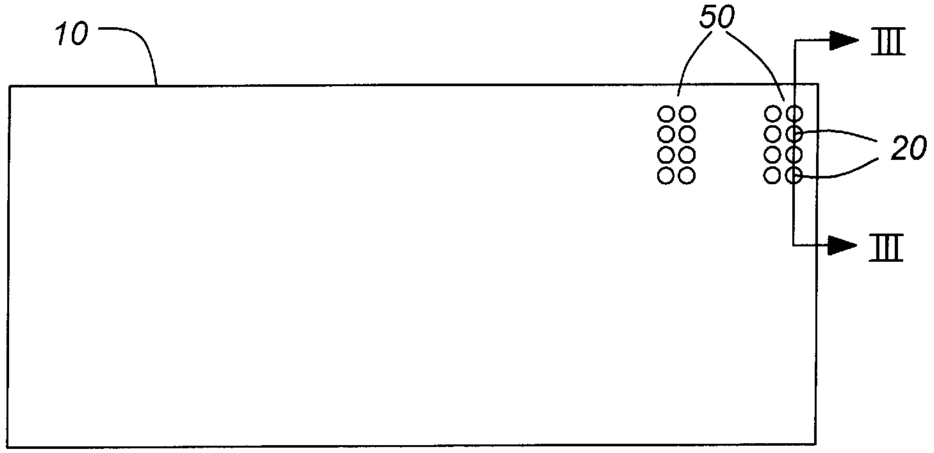
FIG. 2 is a front view of a banknote having incorporated therein, in a pattern in the upper right-hand corner of the banknote, tactile embossed indicia comprised according to that shown in FIG. 1.
Figure 3:
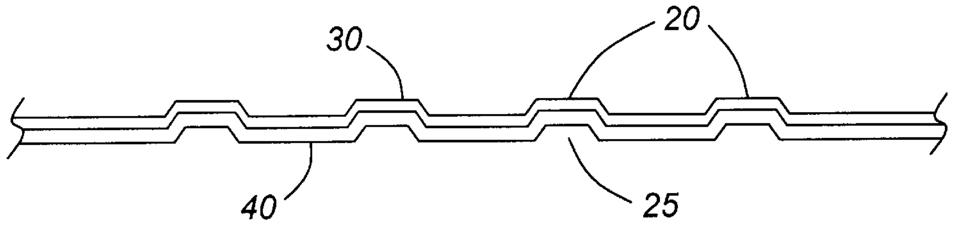
FIG. 3 is an enlarged, schematic cross-sectional view as seen at section III—III of FIG. 2.

In the embodiment shown by the drawings, each embossment 20 creates a raised area in the top surface 35 of the sheet material and a cavity 25 in the bottom surface 37 of the sheet material. As shown by FIG. 2, the banknote 10 is embossed with a plurality of embossments 20 forming tactile indicia which are arranged in a predetermined pattern and can be used by a sight impaired person to identify the characteristic denomination of that banknote by feeling and decoding the indicia.

For each embossment 20 the bottom surface of the sheet material in (at least) the area comprising the cavity 25 is provided with a layer of a fluid reinforcing material 40 which, when dried and/or cured, reinforces the cavity 25. This layer is applied to the surface of the sheet material by coating the surface and some of the reinforcing material is absorbed into the sheet material. The thickness of the reinforcing layer (C) specified herein means the thickness of the layer when it is applied (i.e. before some of it is absorbed into the sheet material).

This reinforcement of the embossment renders its tactility resistant to deterioration when the sheet material 30 is subjected to wear (i.e. since the walls of the embossment are strengthened the embossment is less likely to be flattened if pressure is applied to it). The reinforcing material 40 may be any suitable material whose nature and durability is such that it reinforces the embossment so as to render it more permanent and is able to bond satisfactorily to the selected sheet material and retain flexibility when dried and/or cured (i.e. without becoming brittle) such as by radiation curing, oxidation, polymerization, solvent evaporation, solvent penetration or electron beam. Preferably the reinforcing material to be selected should be compatible with the printing means used to print the banknote or other document utilizing the sheet material such that, for example, it may be applied by roller coating, blade coating, screen printing, gravure printing, flexographic printing or spray coating.

Any number of the varnishes, inks, adhesives and caulking compounds which are readily available in the marketplace may be suitable for selection as the reinforcing material 40. For banknotes comprised of sheet materials made of paper, or having a paper layer on the bottom, a satisfactory reinforcing material is varnish such as the UV overprint varnish produced by Sun Chemical of Brampton, Ontario having the product number R2708-136 which demonstrates good adhesion to paper, provides good flexibility and does not significantly change colour on aging.

Surprisingly, it has been found that the application of a relatively thin layer of such reinforcing material, as shown in FIG. 1, as compared to a complete filling of the cavity 25, is more effective and preferable because in the case of the latter there is tendency for the whole of the material of a filled cavity to become detached from the walls of the cavity and pop out of the cavity when being handled (the degree of flexibility provided by the reinforcing material determining the extent of this).

FIG. 1 illustrates, in cross-section, the structure of the tactile indicia (embossment 20) of a preferred embodiment of the invention. For this embodiment the thickness B of the sheet material 30 is in the range of 75 and 150 micrometers, the embossment 20 has a relief D of between 70 and 150 micrometers and an outer width A of between 500 and 1200 micrometers, and the thickness C of the reinforcing layer (varnish) 40 when it is applied is between 20 and 40 micrometers. However, since some of the varnish is absorbed into the sheet material before it dries/cures, the final thickness is less than this. The size of the relief to be selected for the embossments is dependent on the particular application and the type of sheet material to be used since some materials will allow larger reliefs to be formed (without tearing) than will others but too high and/or too thin an embossment is undesirable as these may be subject to breaking or tearing off of the sheet material. It has been found that some materials will permit a larger relief than their thickness.

In the example shown by the banknote of FIG. 2 the embossments 20 are circular which is a preferred shape for use by sight impaired persons due to its simplicity and uniformity. However, any shape may be utilized for the embossments in accordance with the invention and for different applications the use of different shapes may be preferred.

Figure 4:
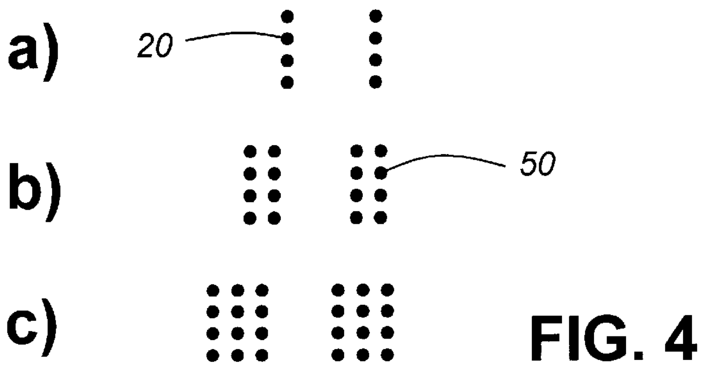
FIG. 4 shows examples of three different patterns ((a), (b) and (c)) of tactile embossed indicia comprised according to that shown in FIG. 1; and, FIG. 5 shows a ten dollar banknote with a preferred configuration of embossments therein.

The banknote 10, provided as an example, includes two spaced symbols 50 which, together, may be designated to identify the denomination of the bank note. A lesser or greater number of these symbols can be designated to identify a different denomination for the banknote. Equally, the number of embossments making up a symbol may be varied as shown by FIG. 4 in which FIG. 4(*a*) shows two symbols 50 each comprising one column of four embossments 20, FIG. 4(*b*) shows two symbols 50 each comprising two adjacent columns of four embossments 20 (being four adjacent rows of two embossments) and FIG. 4(*c*) shows two symbols 50 each comprising three adjacent columns of four embossments (being four adjacent rows of three embossments). It is preferred to use more than one column of embossments per symbol because there is a chance that the banknote could be damaged in such a way as to create a tactile impression therein in the area of the tactile indicia and, particularly if the symbol were to comprise only one column, such an impression could more readily be misread as a symbol by a sight impaired person.

Figure 5:
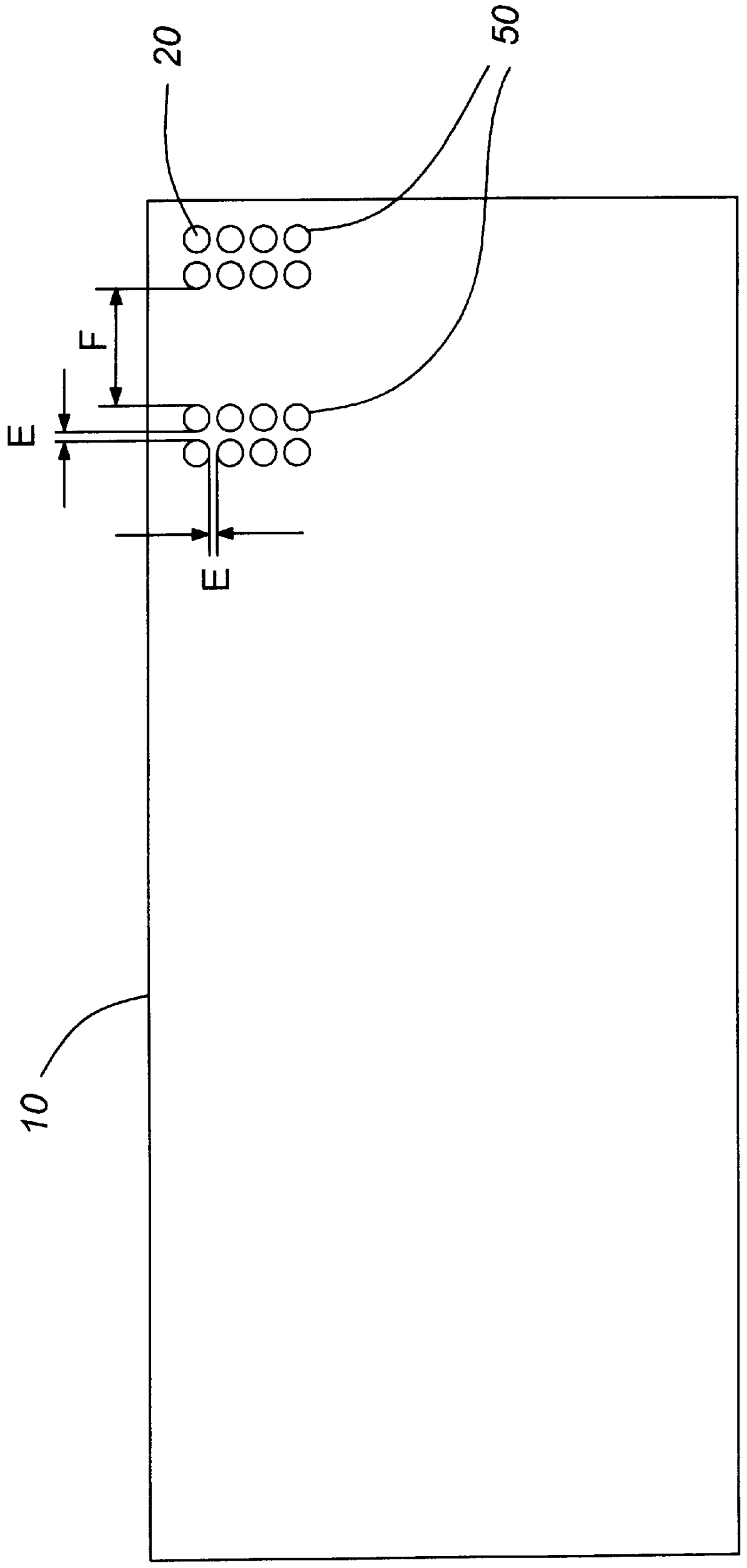

The preferred arrangement of embossments on banknotes to enable sight impaired persons to identify their denomination is shown by FIG. 5 in which each symbol 50 is comprised of two columns of four embossments 20, with each embossment having a relief D of 140 micrometers and an outer width A of 1000 micrometers, and the thicknesses B and C of the sheet material 30 and reinforcing layer 40 when applied are 125 and 20 micrometers, respectively. Further, in this preferred arrangement the edge to edge distance E between each embossment 20 within each symbol 50 is 2000 micrometers and the distance of the spacing F between each symbol 50 is 14.5 millimeters (14,500 micrometers). The embossments 20 are preferably spaced about 3 millimeters (3000 micrometers) from the top and side edges of the bank note. This arrangement has been shown to provide the optimal combination of tactile indicia to result in successful detection of the denomination of a banknote when subject to the wear of circulation.

If desired, the selected reinforcing material 40 may include additives such as optically variable pigments, coloured pigments, phosphors, fluorescors, or any taggants which can be activated by a specific energy wavelength so as to emit in response detectable energy in a specific but different wavelength, in order to provide to the banknote a covert security feature within the tactile indicia.

A further aspect of the invention (not illustrated) utilizes a sheet material comprising thermoplastic, specifically a laminate of outer paper sheets and an inner thermoplastic sheet as described above, to mold tactile indicia into the sheet material. According to this aspect of the invention a sheet material comprising a thermoplastic layer is embossed with a plurality of embossments so as to form tactile indicia therein in such a manner that heat is applied to the sheet material, in at least the area in which the embossments are to be formed, at the same time that the embossments are formed or immediately prior thereto. Thereafter, the sheet material is cooled. Accordingly, the thermoplastic layer of sheet material in the area of the embossments is caused to soften and harden into the form of the embossments and a reinforcing layer of varnish or other suitable material is applied to the embossed laminate, as described above, to provide durable tactile indicia.

What is claimed is:

1. A sheet material comprising tactile indicia the tactility of which is resistant to deterioration wherein said indicia comprises at least one embossment in said sheet material, each said embossment comprising a raised area in one surface of said sheet material and a corresponding cavity in the opposite surface of said sheet material, wherein a layer of reinforcing material covers said opposite surface in and immediately surrounding the area(s) thereof comprising said cavity(ies), said reinforcing material having been applied to said opposite surface after said embossment(s) were formed in said sheet material and said reinforcing material having a substantially uniform thickness, said thickness being substantially less than the relief of said cavity.

2. A sheet material according to claim 1 wherein said reinforcing material is selected from the group consisting of varnishes, inks, adhesives and caulking compounds.

3. A sheet material according to claim 2 wherein said sheet material comprises paper and said reinforcing material is varnish.

4. A sheet material according to claim 3 wherein the thickness of said sheet material is between 75 micrometers and 150 micrometers, the outer width of said embossment is between 500 micrometers and 1200 micrometers and the thickness of said varnish is between 20 micrometers and 40 micrometers.

5. A sheet material according to claim 1, wherein said indicia comprises a plurality of said embossments arranged in a predetermined pattern, said indicia enabling a sight impaired person to identify one or more predetermined characteristics of said sheet material by means of feel.

6. A banknote comprising a sheet material according to claim 5 wherein said characteristic identified by said indicia is the denomination of said banknote.

7. A banknote according to claim 6 wherein said indicia comprise one or more spaced symbols and each said symbol comprises a plurality of said embossments wherein the outer width of said embossments is about 1000 micrometers, said embossments are spaced apart about 2000 micrometers in said symbols and said symbols are spaced apart about 14,500 micrometers.

8. A banknote according to claim 7 wherein each said symbol comprises a plurality of rows and columns of said embossments.

9. A banknote according to claim 8 wherein the number rows of said symbols is four, the number of columns of said symbols is two.

10. A method of making a sheet material comprising tactile indicia the tactility of which is resistant to deterioration wherein said indicia comprises at least one embossment in said sheet material, said method comprising the steps of:

(a) forming said at least one embossment in said sheet material whereby each said embossment comprises a raised area in one surface of said sheet material and a corresponding cavity in the opposite surface of said sheet material;

(b) subsequent to said forming step, applying to said opposite surface of said sheet material in and immediately surrounding the area(s) thereof comprising said cavity(ies) a layer of a fluid reinforcing material; and, (c) drying and/or curing said layer of reinforcing material;

whereby said cured layer of reinforcing material has a substantially uniform thickness and said thickness is substantially less than the relief of said cavity.

11. A method of making a sheet material according to claim 10 wherein said reinforcing material is selected from the group consisting of varnishes, inks, adhesives and caulking compounds.

12. A method of making a sheet material according to claim 11 wherein said sheet material comprises paper and said reinforcing material is varnish.

13. A method of making a sheet material according to claim 12 wherein the thickness of said sheet material is between 75 micrometers and 150 micrometers, the outer width of said embossment is between 500 micrometers and 1200 micrometers and the thickness of said varnish is between 20 micrometers and 40 micrometers.

14. A method of making a sheet material according to claim 13 wherein said sheet material is embossed with a plurality of said embossments arranged as indicia in a predetermined pattern, said indicia enabling a sight impaired person to identify one or more predetermined characteristics of said sheet material by means of feel.

15. A method of making a sheet material according to claim 14 wherein said sheet material is a banknote and said characteristic identified by said indicia is the denomination of said banknote, whereby said indicia comprises one or more spaced symbols and each said symbol comprises a plurality of said embossments, the outer width of said embossments being about 1000 micrometers, said embossments being spaced apart about 2000 micrometers in said symbols and said symbols being spaced apart about 14,500 micrometers.

16. A method of making a sheet material according to claim 15 wherein each said symbol comprises a plurality of rows and columns of said embossments.

17. A method of making a sheet material according to claim 16 wherein the number rows of said symbols is four and the number of columns of said symbols is two.

* * * * *